United States Patent
Zurawski

(10) Patent No.: US 7,680,581 B2
(45) Date of Patent: Mar. 16, 2010

(54) METHOD FOR DIAGNOSING AIR INTAKE THROTTLE ACTUATORS FOR INTERNAL COMBUSTION ENGINES

(75) Inventor: Mark Allen Zurawski, Northville, MI (US)

(73) Assignee: Detroit Diesel Corporation, Detroit, MI (US)

( * ) Notice: Subject to any disclaimer, the term of this patent is extended or adjusted under 35 U.S.C. 154(b) by 249 days.

(21) Appl. No.: 11/959,601

(22) Filed: Dec. 19, 2007

(65) Prior Publication Data

US 2009/0164092 A1    Jun. 25, 2009

(51) Int. Cl.
*F02D 11/10* (2006.01)
*B60T 7/12* (2006.01)

(52) U.S. Cl. ........................ 701/103; 123/399

(58) Field of Classification Search ............. 123/399, 123/396, 403, 361; 701/103, 115
See application file for complete search history.

(56) References Cited

U.S. PATENT DOCUMENTS

| | | | | |
|---|---|---|---|---|
| 4,854,283 | A | * | 8/1989 | Kiyono et al. ............ 123/361 |
| 5,601,063 | A | * | 2/1997 | Ohashi et al. ............ 123/396 |
| 6,175,787 | B1 | | 1/2001 | Breed |
| 6,226,576 | B1 | | 5/2001 | Torno et al. |
| 6,298,718 | B1 | | 10/2001 | Wang |
| 6,314,375 | B1 | | 11/2001 | Sasaki et al. |
| 6,329,777 | B1 | * | 12/2001 | Itabashi et al. ............ 318/434 |
| 6,456,928 | B1 | | 9/2002 | Johnson |
| 6,497,227 | B2 | | 12/2002 | Wang et al. |
| 6,687,601 | B2 | | 2/2004 | Bale et al. |
| 2004/0186659 | A1 | * | 9/2004 | Hashimoto et al. ........ 701/114 |

* cited by examiner

*Primary Examiner*—Mahmoud Gimie
(74) *Attorney, Agent, or Firm*—Bill C. Panagos; Rader, Fishman & Grauer, PLLC

(57) ABSTRACT

A method for diagnosing an air intake throttle with a spring activated throttle actuator, on an electronic controlled internal combustion engine system including an electronic control unit (ECU) with memory, a battery electrically connected to said engine and an ignition switch for connecting said battery to said engine and supplying current, comprising engaging the ignition switch to close a circuit between said battery and said engine; applying a first predetermined voltage to an air intake throttle plate actuator and determining a first period of throttle response time elapsed from a full open throttle position to a full close throttle position for a first throttle velocity; discontinuing application of said first predetermined voltage to said air intake throttle actuator and determining a second period of throttle response time elapsed from a full close throttle position to a full open throttle position for a second throttle velocity; applying a second voltage to said air intake throttle plate actuator and determining a third period of throttle response time elapsed from a full open throttle position to a full close throttle position for a third throttle velocity; and determining a fourth period of throttle response time elapsed from a full close throttle position to a full open throttle position with no voltage applied to the throttle plate actuator for a fourth throttle velocity.

7 Claims, 3 Drawing Sheets

METHOD FOR DIAGNOSING AIR INTAKE THROTTLE ACTUATORS FOR INTERNAL COMBUSTION ENGINES

TECHNICAL FIELD OF THE INVENTION

Air intake throttles in internal combustion engines are subjected to harsh conditions and demanding performance standards. Oftentimes, the intake air throttle plate is manufactured such that there is wide variability in specification. In addition, throttle plates are subjected to harsh conditions and are subject to wear, especially with regard to the throttle plate actuator devices. The throttle plate actuator device is usually spring actuated, and the spring and the motor that actually actuates the throttle plate, may become worn or otherwise unable to actuate the throttle plate as required, especially with regard to current high performance engines and current emission standards. It has become increasingly important to determine whether and when a throttle plate actuator is in need of service to maintain the engine in its original performance configuration.

It is desirable to have a method for diagnosing the intake air throttle actuators for internal combustion engines to detect malfunctions of the throttle or degradation in throttle performance due to worn or faulty throttle plate actuators.

BRIEF SUMMARY OF THE INVENTION

In one aspect the present invention relates to a method for diagnosing an air intake throttle with a spring activated throttle actuator, on an electronic controlled internal combustion engine system including an electronic control unit (ECU) with memory, a battery electrically connected to said engine and an ignition switch for connecting said battery to said engine and supplying current. The method comprises engaging the ignition switch to close a circuit between said battery and said engine, applying a first predetermined voltage to an air intake throttle plate actuator and determining a first period of throttle response time elapsed from a full open throttle position to a full close throttle position for a first throttle velocity, discontinuing application of said first predetermined voltage to said air intake throttle actuator and determining a second period of throttle response time elapsed from a full close throttle position to a full open throttle position for a second throttle velocity, applying a second voltage to said air intake throttle plate actuator and determining a third period of throttle response time elapsed from a full open throttle position to a full close throttle position for a third throttle velocity, and determining a fourth period of throttle response time elapsed from a full close throttle position to a full open throttle position with no voltage applied to the throttle plate actuator for a fourth throttle velocity.

The method further includes logging a plausibility fault in the ECU memory if the throttle response time exceeds at least three predetermined time checks, logging a fault in the ECU memory if the velocity of the throttle falls below a predetermined calibrated threshold while moving between positions. The method of further includes logging a plausibility fault in ECU memory if the current necessary to hold the throttle plate in a desired position exceeds more than some calibratable percentage of spring force of the spring activated throttle plate actuator.

The current applied to the throttle plate actuator is pulsed at ever increasing current with sufficient delay between each increase in current as to not exceed a maximum average current for a given time if the throttle does not attain full open or full closed throttle position. Preferably, the ramp rate and delay between successive current pulses are calibratable.

In a preferred embodiment, the first predetermined period of time is approximately 200 milliseconds, the first predetermined voltage is approximately 2 amps, the second predetermined time is approximately 80 milliseconds, the third predetermined period of time is approximately 320 milliseconds, the second predetermined voltage is approximately 1.75 amps and the fourth predetermined period of time is approximately 350 milliseconds.

DETAILED DESCRIPTION OF THE PREFERRED EMBODIMENT(S)

Figure 1:
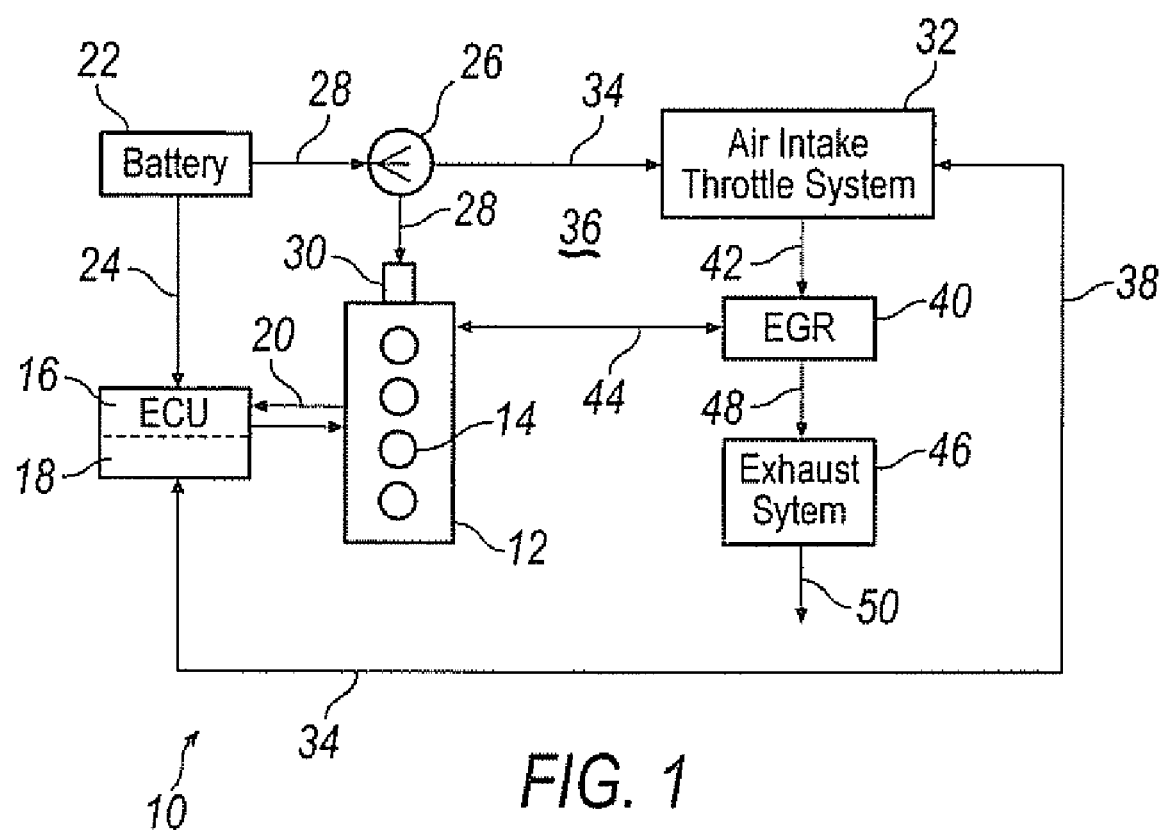
FIG. 1 is a representation of an internal combustion engine with an air intake throttle, battery, ECU with memory and an ignition switch.

Turning now to the drawings wherein like numbers refer to like structures, FIG. 1 is a representation of an internal combustion engine system 10 comprising an internal combustion engine 12, of any sort, but preferably an Otto Cycle or Rankin cycle compression ignition engine, having pistons 14 reciprocally moveable in cylinders 15 in said engine in the conventional manner as is well know to those skilled in the art. An Electronic Control Unit, (ECU) 16 having memory 18 which may be PROM, EPROM, EEPROM, FLASH or any other volatile or nonvolatile memory 18 wherein reside tables populated by various values for operating the engine and its componentry. The ECU may be comprised of one module or may be comprised of two modules or controllers, each in communication with the other, and in communication with the engine over an ECAN link 20. The controllers have a computer program therein to operate the engine. In the present instance, it is preferred to use a DDEC control software as is available from Detroit Diesel Corporation.

A battery 22 is in electrical connection 24 with the ECU to provide power directly to the ECU to ensure data stored in the ECU is not lost when the ignition is switched to a key off position. Ignition switch 26 is in electrical connection with the battery via electrical connection 28. When the ignition is turned from a key off position to a key on position, current from the battery flows through the ignition switch to activate the part desired. For example, when the key in one on position, the starter 30 is activated through current supplied through electrical connection 28. When the key is in a second on position, current is supplied to the air intake manifold system 32 through electrical connection 34 and a circuit 36 is closed between the battery and the air intake throttle system. The air intake throttle system is in electronic communication with the ECU via electronic communication 38 to receive operating instructions from the ECU and to transmit operating data to the ECU indicative of the air throttle operating conditions. The Air intake throttle system is in fluid communication with the EGR 40 via conduit 42 for supply of air to the EGR, and the EGR is in fluid communication with the engine through conduit 44, as well as with the exhaust system 46 through conduit 48. The exhaust system vents exhaust gases from the engine system via outlet conduit 50.

Figure 2:
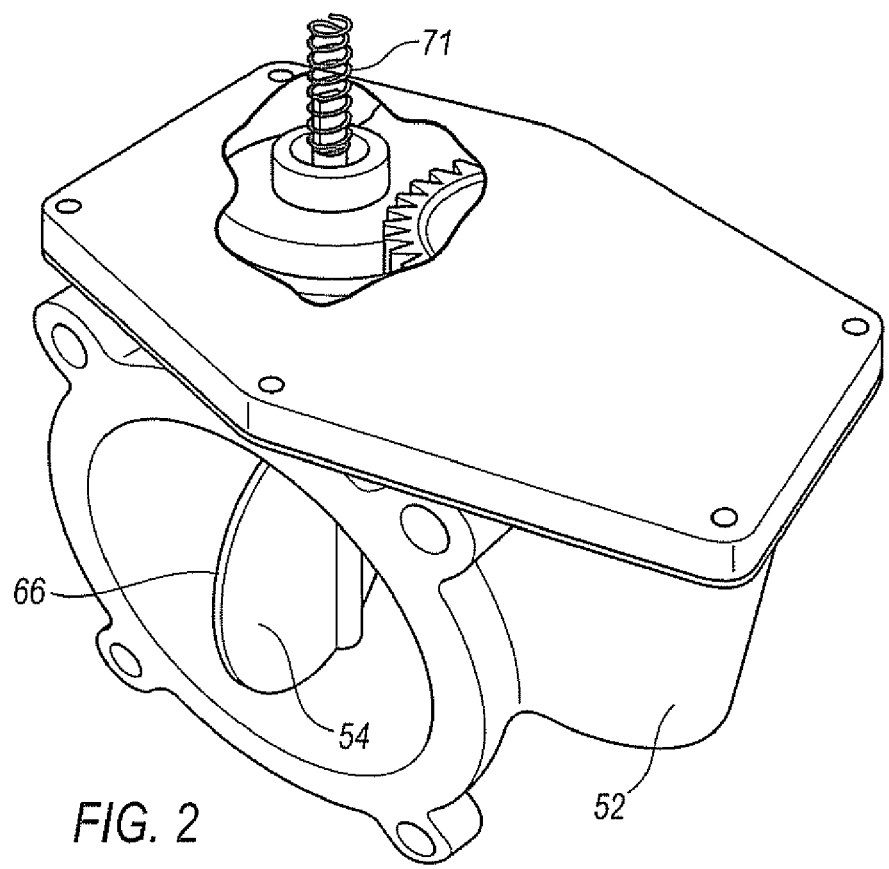
FIG. 2 is a perspective detailed view of an air intake throttle plate and actuator assembly.
Figure 3:
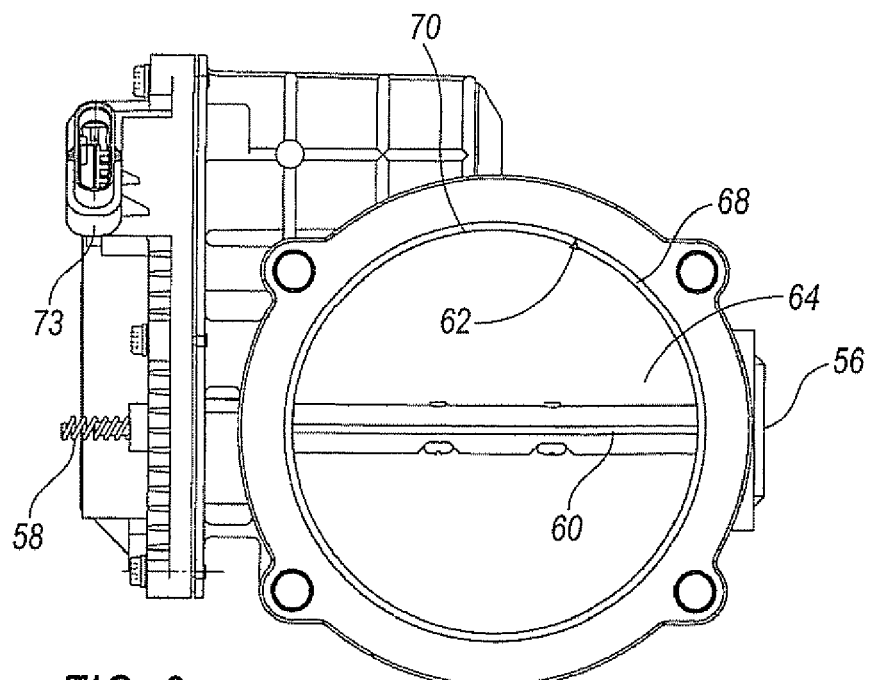
FIG. 3 is a top plan view of the air intake throttle mechanism and actuator assembly.

FIG. 2 is a perspective detailed view of an air intake throttle system showing the throttle plate with an actuator and FIG. 3 is a top plan view of the air intake throttle mechanism and actuator assembly. Specifically, the air intake throttle has a body 52 wherein a throttle plate 54 is pivotally mounted at pivots 56 and 58, respectively, to permit the throttle plate to pivot about axis 60. The throttle plate is manufactured to be of such dimension as to cover throttle throat 62 when in a fully closed position 64, to obstruct the flow of air into the engine and EGR, and permit the flow of air when the throttle plate is in a fully open position 66 as indicated in FIG. 2. The throttle plate throat 62 may have a flange 68 extending circumferentially around the throttle at a position in the throttle to facilitate a mating engagement with the throttle plate edges 70 to provide for a fully closed position, as is customary in the construction of air intake throttle bodies. A spring activated actuating device 71 actuates the throttle plate upon command from the ECU by application of current to the actuating device 73 (a motor) causing the actuating device to pivotally move in the throttle body from an open position to a closed position, and by the cessation of current, the throttle moves from a closed position to an open position. By the application of current of varying amounts to the actuating device, the throttle is moved within the throttle body to any desired position.

It has been a recurring challenge in the art to diagnose throttle plate actuators in internal combustion engines. The throttle plate can wear, or the actuators can fatigue, and the efficiency of the throttle is affected. The present invention is directed to an approach to diagnose throttle valves in air intake manifolds.

Figure 4:
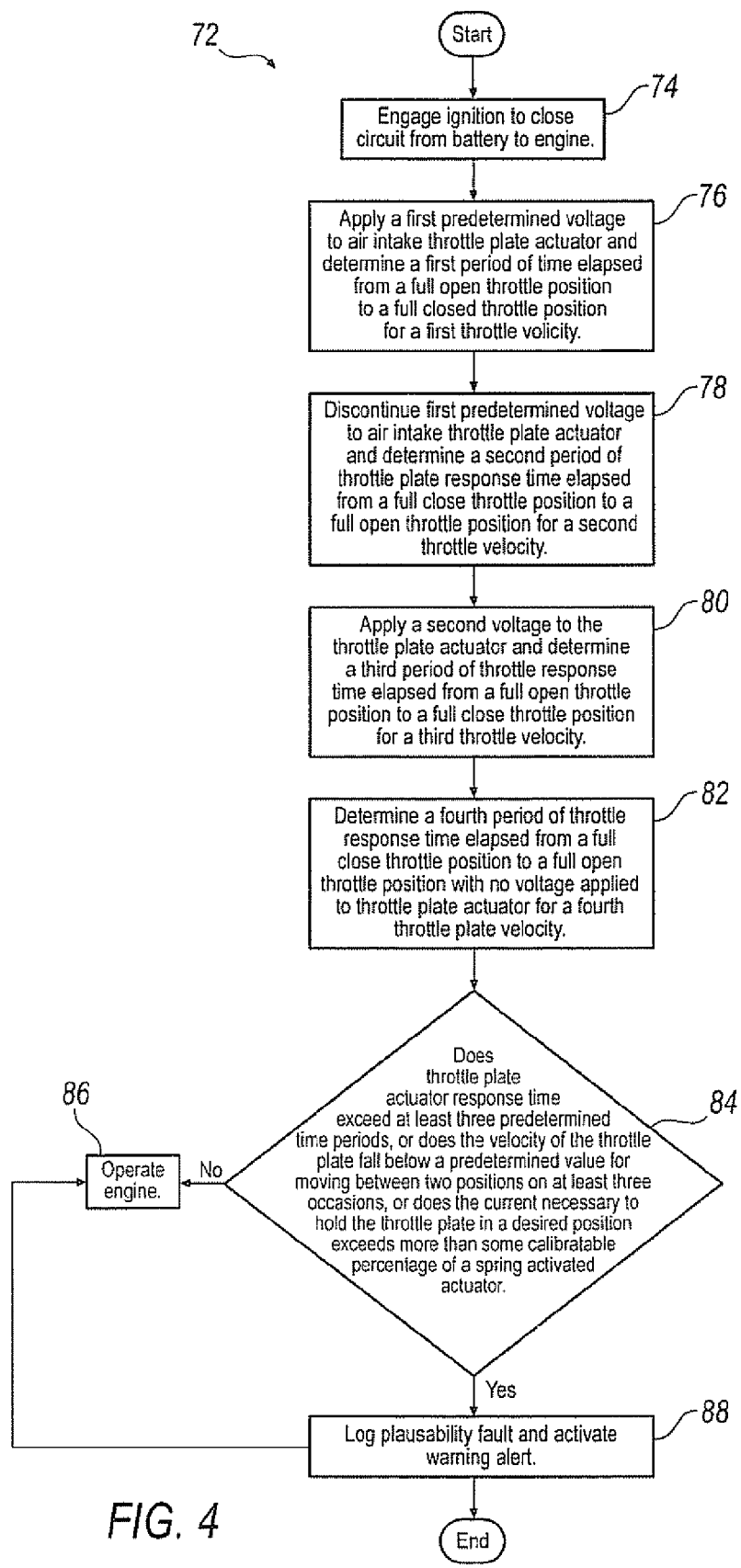
FIG. 4 is a schematic representation of a software flow chart showing one method for diagnosing intake throttle actuators for internal combustion engines.

FIG. 4 is a schematic representation of a software flow chart of one method 72 according to the present invention. Specifically, step 74 is engaging the ignition switch to close a circuit between the battery and the engine. This may be accomplished by any means, including a first key on position or a second key on position. Step 76 is applying a first predetermined voltage to the air intake throttle plate actuator and determining a first period of time elapsed from a full open throttle position to a full closed throttle position for a first throttle velocity. The instructions for the application of voltage are contained in table in the memory of the ECU, and the time elapsed is sensed at the throttle by a sensor and transmitted to the ECU for comparison to a time value in memory. The velocity is determined by dividing the voltage applied by the time of response by the throttle plate.

Step 78 is discontinuing application of the first predetermined voltage to the air intake throttle plate actuator and determining a second period of throttle plate response time elapsed from a full close throttle position to a full open throttle position for a second throttle velocity. Step 80 is applying a second voltage to the throttle plate actuator and determining a third period of throttle response time elapsed form a full open throttle position to a full close throttle position for a third throttle velocity and step 82 is determining a fourth period of throttle response time elapsed from a full close throttle position to a full open throttle position with no voltage applied to the throttle plate for a fourth throttle velocity.

The current may be pulsed at ever increasing current with sufficient delay between each increase in current as to not exceed a maximum average current for a given time if the throttle does not attain full open or full closed throttle position. The current ramp rate and delay between successive current pulses are calibratable.

Step 84 is determining whether the throttle plate actuator response time exceeds at least three predetermined time periods as set forth in steps step 76 through 82, or whether the velocity of the throttle plate fall below a predetermined value for moving between two positions on at least three occasions as set forth in steps 76 though 82, or does the current necessary to hold the throttle plate in a desired position exceed more than some predetermined calibratable percentage of a spring and motor activated actuator. If the answer is no, the software moves to step 86, which is operate engine. If the answer is yes, step 88 is logging a plausibility fault in the ECU memory if the throttle plate response time exceeds at least three predetermined time period, or if the velocity of the throttle plate falls below a predetermined value for moving between two position on at least three times, or memory if the current necessary to hold the throttle plate in a desired position exceeds more than some calibratable percentage of spring force of the spring activated throttle plate actuator. A warning alert may be activated to alert an operator of the potential condition and bring the vehicle in for servicing. After logging the fault, the engine moves to step 86, which is operate engine.

Preferably, the first predetermined period of time is approximately 200 milliseconds and the first predetermined voltage is approximately 2 amps. The second predetermined time is approximately 80 milliseconds and the said third predetermined period of time is approximately 320 milliseconds. The second predetermined voltage is approximately 1.75 amps and the fourth predetermined period of time is approximately 350 milliseconds.

Those skilled in the art recognize that the words used in this specification are words of description, and not words of limitation. Many variations and modifications are possible without departing from the scope and spirit of the invention as set forth in the appended claims.

What is claimed as new and desired to be protected by Letters Patent of the United States is:

1. A method for diagnosing an air intake throttle with a spring and motor activated throttle actuator, on an electronic controlled internal combustion engine system including an electronic control unit (ECU) with memory, a battery electrically connected to said engine and an ignition switch for connecting said battery to said engine and supplying current, comprising:

engaging the ignition switch to close a circuit between said battery and said engine;

applying a first predetermined voltage to an air intake throttle plate actuator and determining a first period of throttle response time elapsed from a full open throttle position to a full close throttle position for a first throttle velocity;

discontinuing application of said first predetermined voltage to said air intake throttle actuator and determining a second period of throttle response time elapsed from a full close throttle position to a full open throttle position for a second throttle velocity;

applying a second voltage to said air intake throttle plate actuator and determining a third period of throttle response time elapsed from a full open throttle position to a full close throttle position for a third throttle velocity; and determining a fourth period of throttle response time elapsed from a full close throttle position to a full open throttle position with no voltage applied to the throttle plate actuator for a fourth throttle velocity.

2. The method of claim 1, wherein said first predetermined period of time is approximately 200 milliseconds; said first predetermined voltage is approximately 2 amps; said second predetermined time is approximately 80 milliseconds; said third predetermined period of time is approximately 320 milliseconds, said second predetermined voltage is approximately 1.75 amps and said fourth predetermined period of time is approximately 350 milliseconds.

3. The method of claim 1, further including logging a plausibility fault in the ECU memory if the throttle response time exceeds at least three predetermined time checks.

4. The method of claim 1, further including logging a fault in the ECU memory if the velocity of the throttle falls above or below a predetermined calibrated threshold while moving between positions.

5. The method of claim 1 wherein the current is pulsed at ever increasing current with sufficient delay between each increase in current as to not exceed a maximum average current for a given time if the throttle does not attain full open or full closed throttle position.

6. The method of claim 1, further including logging a plausibility fault in ECU memory if the current necessary to hold the throttle plate in a desired position exceeds more than some calibratable percentage of spring force of the spring activated throttle plate actuator.

7. The method of claim 5, wherein the ramp rate and delay between successive current pulses are calibratable.

* * * * *